US009000740B2

(12) United States Patent (10) Patent No.: US 9,000,740 B2
Touzani et al. (45) Date of Patent: Apr. 7, 2015

(54) TWO-DIRECTIONAL CURRENT DOUBLE-BOOST QUADRATIC DC/DC CONVERTER

(75) Inventors: Youssef Touzani, Chatou (FR); Laid Kefsi, Villejuif (FR); Gerard Champenois, Saint Benoit (FR); Jean-Paul Gaubert, Poitiers (FR)

(73) Assignees: IFP Energies Nouvelles, Rueil Malmaison (FR); Universite de Poitiers, Poitiers (FR)

( * ) Notice: Subject to any disclaimer, the term of this patent is extended or adjusted under 35 U.S.C. 154(b) by 195 days.

(21) Appl. No.: 13/810,955

(22) PCT Filed: Jul. 29, 2011

(86) PCT No.: PCT/EP2011/063118
§ 371 (c)(1),
(2), (4) Date: Jan. 18, 2013

(87) PCT Pub. No.: WO2012/013786
PCT Pub. Date: Feb. 2, 2012

(65) Prior Publication Data
US 2013/0119966 A1 May 16, 2013

(30) Foreign Application Priority Data
Jul. 30, 2010 (FR) ...................................... 10 56339

(51) Int. Cl.
*G05F 1/24* (2006.01)
*H02M 3/158* (2006.01)
(Continued)

(52) U.S. Cl.
CPC .............. *H02M 3/158* (2013.01); *B60L 11/005* (2013.01); *B60L 11/1868* (2013.01); *H02M 3/1582* (2013.01); *B60L 2210/12* (2013.01); *B60L 2210/14* (2013.01); *B60L 2220/42* (2013.01); *H02M 2001/007* (2013.01); *Y02T 10/7005* (2013.01); *Y02T 10/7022* (2013.01); *Y02T 10/7233* (2013.01); *Y02T 10/7225* (2013.01); *Y02T 10/7066* (2013.01); *Y02T 10/648* (2013.01)

(58) Field of Classification Search
CPC ... H02M 3/156; H02M 3/158; H02M 5/2573; H02M 3/1582; H02M 3/1588; H02M 1/084; G05F 3/08; H05B 37/02
USPC ......... 323/220, 222, 223, 225, 259, 271, 344, 323/349
See application file for complete search history.

(56) References Cited

U.S. PATENT DOCUMENTS 4,346,431 A * 8/1982 Steigerwald .................... 363/27
5,138,249 A 8/1992 Capel
(Continued)

FOREIGN PATENT DOCUMENTS

AT 399 625 B 6/1995
EP 0 460 573 A1 12/1991

OTHER PUBLICATIONS

International Search Report issued Feb. 21, 2012, in PCT/EP2011/063118.
(Continued)

*Primary Examiner* — Matthew Nguyen
*Assistant Examiner* — Alex Torres-Rivera
(74) *Attorney, Agent, or Firm* — Oblon, McClelland, Maier & Neustadt, L.L.P.

(57) ABSTRACT

A current reversible DC/DC double-boost quadratic converter, capable of performing high transformation ratios.

5 Claims, 5 Drawing Sheets

(51) Int. Cl.
*B60L 11/00* (2006.01)
*B60L 11/18* (2006.01)
*H02M 1/00* (2006.01)

(56) References Cited

U.S. PATENT DOCUMENTS

| | | | | |
|---|---|---|---|---|
| 6,166,527 | A * | 12/2000 | Dwelley et al. | 323/222 |
| 6,215,286 | B1 * | 4/2001 | Scoones et al. | 323/222 |
| 6,304,460 | B1 * | 10/2001 | Cuk | 363/16 |
| 6,765,371 | B2 * | 7/2004 | Kataoka | 323/222 |
| 7,382,113 | B2 * | 6/2008 | Wai et al. | 323/222 |
| 8,138,744 | B2 * | 3/2012 | Nagano et al. | 323/350 |
| 8,593,115 | B2 * | 11/2013 | Walter et al. | 323/223 |

OTHER PUBLICATIONS

He Hongwen, et al., "DC/DC converters design and control for hybrid power system", International Conference on Intelligent Computation Technology and Automation, XP 031716368, May 11, 2010, pp. 1089-1092.

Zhang Jiancheng, et al., "An Effective Hybrid Energy Storage System Based on Battery-EDLC for Distributed Generation Systems", 5th IEEE Conference on Industrial Electronics and Applications, XP 031711846, Jun. 15, 2010, pp. 819-824.

* cited by examiner

-- PRIOR ART --

-- PRIOR ART --

-- PRIOR ART --

-- PRIOR ART --

TWO-DIRECTIONAL CURRENT DOUBLE-BOOST QUADRATIC DC/DC CONVERTER

TECHNICAL DOMAIN

This invention relates to a DC/DC voltage converter, in other words a system designed to maintain the energy fluence between two voltage sources. The invention is particularly applicable to a converter of the type usually called a chopper, corresponding to average and high power applications.

From the point of view of the electrical circuit, this type of converter may be considered as being a transformer of direct electrical magnitudes. There are two basic variants that define the type of DC/DC converter:
- if the output voltage is less than the input voltage, it is said to be a step-down DC/DC converter or « buck » converter,
- if the output voltage is greater than the input voltage, it is said to be a step-up DC/DC converter or « boost » converter.

For this type of converter, the term two-directional current is used when the input or output current can be in either direction during operation of the converter.

STATE OF PRIOR ART

DC/DC step-up or Boost converters are used particularly on electrical and hybrid vehicles. They interface the battery voltage and the DC bus of the electric motor inverter, by increasing or reducing the voltage at the DC bus terminals. They may also be used for coupling a battery and a supercapacitor at the input to an inverter.

FIG. 1 is a diagram showing an electrical conversion system for an electric or hybrid vehicle. Reference 1 denotes a battery outputting a voltage U between points A and B. The input to an inverter 2 is connected between points A and B. The output from the inverter 2 powers the three-phase electric motor 3 of the vehicle. A DC/DC converter 4 makes the interface between firstly points A and B, and secondly a supercapacitor 5. On this diagram, $I_{bat}$ represents the battery current and $I_{supercap}$ represents the current in the supercapacitor.

The use of DC/DC converters in this domain has a number of advantages. They enable management of energy flows between the DC bus of the inverter and the energy storage system. They enable the use of low voltage batteries. They enable the use of inverters with very high DC bus voltages (high speed machines). They enable a larger range of speed variations. They give better total efficiency of the electrical conversion system.

The trend in hybrid and electric vehicles, is towards increasingly high voltages on the inverter DC bus. The advantage of this trend is to reduce the copper cross-section in the winding and reduce the size of electric machines. But this requires the use of DC/DC converters to step up the battery voltage.

A second use of DC/DC Boost type converters consists of coupling onboard energy storage devices. For example, coupling of a battery (energy) and a supercapacitor (power).

When the only energy source is a battery, it is very difficult to maintain the voltage on the DC bus when the load can absorb or output a high current during a very short time (for example during acceleration or braking of the vehicle). A fluctuation of the voltage output by the battery installed on a vehicle with a hybrid motor drive can thus be observed during positive and negative peak currents. This is due to the fact that a battery is intended (and often sized) to provide electrical energy (nominal power) and not instantaneous power. The battery alone is also incapable of absorbing the entire braking energy during a very short time interval. The use of batteries alone (voltage instability) accelerates aging. The fact of associating a supercapacitor (sized for power) can reduce battery voltage fluctuations during all operating ranges of the battery and make use of the entire electrical energy available during braking.

If a DC/DC converter is used for coupling a battery and a supercapacitor, the battery imposes the converter output voltage. The converter is directly controlled in current to supply power peaks during accelerations or to absorb current peaks when braking. The DC/DC converter used is necessarily of the current-reversible Boost type because the voltage of a supercapacitor can drop by 50% (to use 75% of the supercapacitor charge).

In an electric or hybrid vehicle type of application, the typical specification for the DC/DC converter will impose an output DC voltage with a negligible ripple ratio (less than 3%). The elementary structure of the converter is then associated with linear elements (inductance coils, capacitors) designed to adapt the sources (current/voltage) and for filtering.

FIG. 2 is a diagram illustrating the electrical conversion system used on the RX 400 h motor fitted on the Lexus hybrid vehicle. Reference 11 refers to a 288 V battery connected to the input to a current-reversible DC/DC Boost converter 12 outputting an output voltage of 650 V at the terminals of the resistance 13 and the smoothing capacitor 14. The output voltage from the converter powers a first inverter 15 and a second inverter 16. The inputs to the inverters 15 and 16 are provided with filter capacitors 17 and 18. The inverter 15 outputs an AC power supply voltage to the motor 19 while the inverter 16 recovers current generated by the motor 20.

The converter 12 receives voltage from the battery 11 at the terminals of the filter capacitor 21. This voltage is transmitted through an induction coil 22 to an IPM « Intelligent Power Module » ) 23.

FIGS. 3A and 3B are diagrams illustrating the variation in the transformation ratio RT of the input voltage to the converter 12 (current reversible DC/DC Boost converter) and the efficiency ρ of the converter (ordinates) relative to the cyclic ratio RC (abscissas). The curves shown in FIGS. 3A and 3B have been plotted by modelling losses in this type of device (conduction, switching and in passive components). Calculations were made for a 40 kW power converter (200 V input voltage and an output voltage controlled by the cyclic ratio of the control signal). The curves in FIGS. 3A and 3B show that the efficiency of the converter reduces as the voltage transformation ratios increase. The cyclic ratio of the control signal corresponds to the « time » duration of the control pulse divided by the converter chopping period. This ratio varies within the range 0 to 1.

In general, when attempting to couple onboard energy sources, the objective is to reduce the size, weight and cost of the onboard device without changing the efficiency. When a supercapacitor is coupled to a battery, this coupling must not create any size, cost and weight constraints more severe than simply adding additional cells into the battery. In other words, the voltage of the supercapacitor must be lower than the battery voltage. For example, if the voltage of the supercapacitor is equal to half the battery voltage, the standard reversible Boost converter could be used with an efficiency of the order of 92%. However, if it is required to use the entire charge range of the supercapacitor, the converter will have a much lower efficiency (of the order of 80%). If it is required to reach 50% of the supercapacitor voltage, then a voltage transformation ratio of more than 4 will be necessary. This problem is particularly important when the nominal voltage of the supercapacitor is low.

PRESENTATION OF THE INVENTION

A new type of DC/DC Boost type conversion topology is proposed to overcome the problems of prior art described above, capable of making higher transformation ratios than devices according to prior art and with exactly the same efficiency. This new device may be called a « current-reversible double-boost quadratic DC/DC converter ».

Therefore, the purpose of the invention is a current-reversible DC/DC Boost converter that will act as an interface between a first DC voltage source and a second DC voltage source, the voltage of the first DC voltage source being less than the voltage of the second DC voltage source, the topology of the converter being composed of the following branches:
- a first branch connecting the positive poles of the first and the second DC voltage sources and comprising a first induction coil, a first switch controlled in opening and in closing, a second induction coil and a third switch controlled in opening and in closing, in series from the first to the second DC voltage sources;
- a second branch connecting the negative poles of the first and the second DC voltage sources;
- a third branch, connected in parallel to the first switch and the second coil in series, comprising a diode of which the anode is on the side of the positive pole of the first voltage source;
- a fourth branch, connected between the second branch and the part of the first branch located between the first induction coil and the first switch, comprising a second diode of which the anode is on the side of the second branch;
- a fifth branch, connected between the second branch and the part of the first branch located between the first switch and the second induction coil, comprising a first capacitor;
- a sixth branch, connected between the second branch and the part of the first branch located between the second induction coil and the third switch, comprising a second switch controlled in opening and in closing;
- a seventh branch, connected in parallel on the second DC voltage source and comprising a second capacitor;
the converter comprising means of controlling switches so that:
  when the current in the converter circulates from the first to the second voltage source, during a control period varying from 0 to T and for a cyclic ratio α
    from t=0 to time t=αT, where 0<α<1, the first and third switches are open and the second switch is closed;
    from t=αT to time t=T, the first and third switches are closed and the second switch is open;
  when the current in the converter circulates from the second to the first voltage source for a control period varying from 0 to T and for a cyclic ratio α:
    from time t=0 to time t=αT, where 0<α<1, the first and third switches are closed and the second switch is open;
    from time t=αT to time t=T, the first and third switches are open and the second switch is closed.

Preferably, the cyclic ratio α is between 0.25 and 0.75.

Advantageously, switches controlled in opening and in closing are components chosen from among MOSFETs and IGBTs, with diodes installed in parallel.

BRIEF DESCRIPTION OF THE DRAWINGS

The invention will be better understood and other advantages and special features will become clear after reading the following description, given as non-limitative examples accompanied by the appended drawings among which.

DETAILED PRESENTATION OF PARTICULAR EMBODIMENTS

Figure 1:
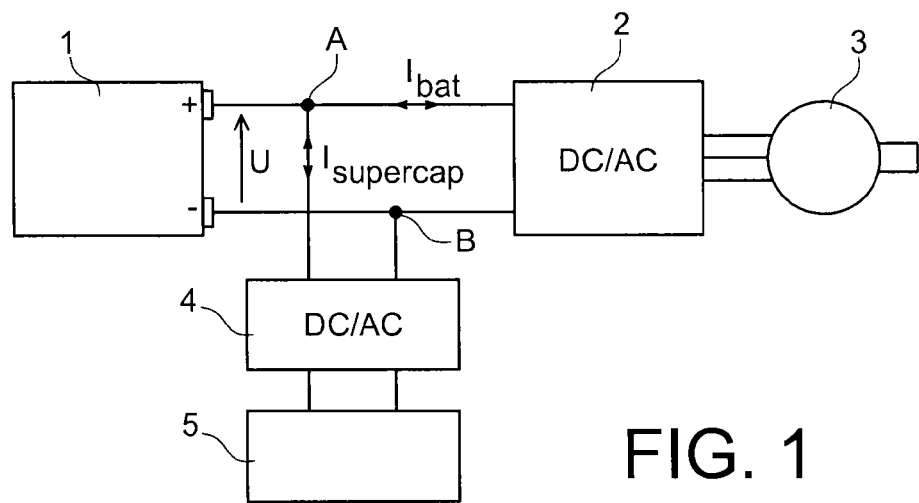
FIG. 1 is a diagram showing an electrical conversion system for an electric or hybrid vehicle.
Figure 2:
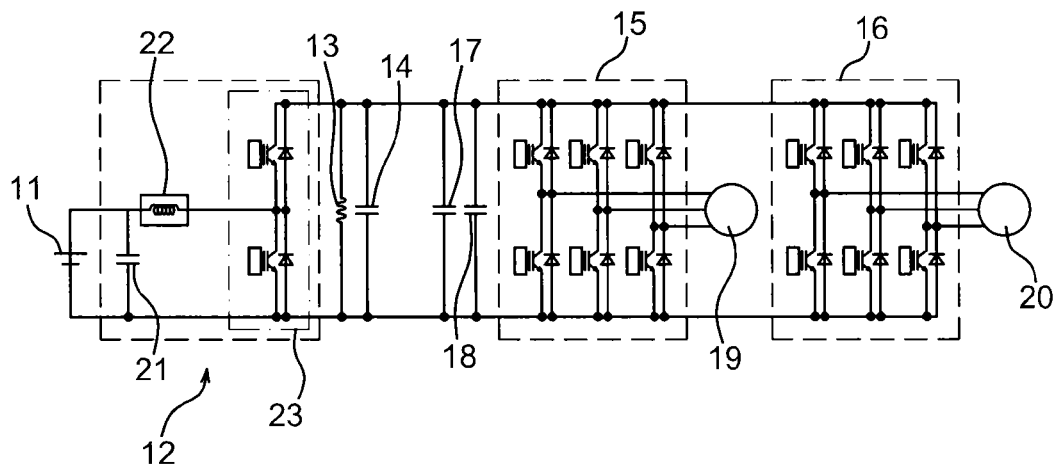
FIG. 2 is a diagram showing an electrical conversion system used on a hybrid vehicle, according to prior art.
Figure 4:
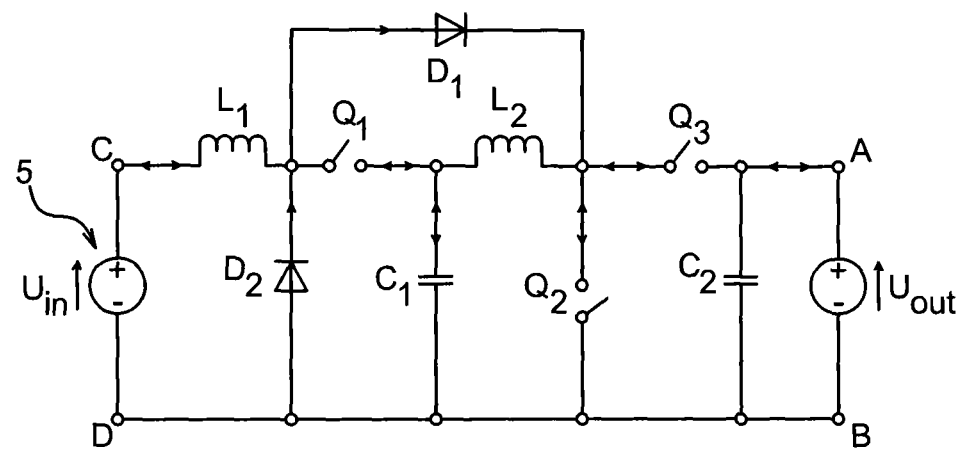
FIG. 4 is a diagram showing the topology of a current-reversible double-boost quadratic converter according to this invention.

FIG. 4 is a diagram showing the topology of a current-reversible double-boost quadratic converter according to this invention. The converter shown in this figure forms the interface between the supercapacitor 5, the terminals (points C and D) of which receive an input voltage $U_{in}$, and points A and B (see FIG. 1) between which there is an output voltage $U_{out}$.

A first induction coil $L_1$, a first switch $Q_1$, a second induction coil $L_2$ and a third switch $Q_3$ are connected in series between points C and A. The connection between points D and B is a connection to the ground.

A diode $D_1$ is connected in parallel onto elements $Q_1$ and $L_2$ installed in series. The anode of the diode $D_1$ is on the same side as point C while its cathode is on the same side as point A.

A diode $D_2$ is connected between the ground and the connection between elements $L_1$ and $Q_1$. The anode of diode $D_2$ is connected to the ground.

A capacitor $C_1$ is connected between the ground and the connection between elements $Q_1$ and $L_2$. A capacitor $C_2$ is connected between points A and B.

Un second switch $Q_2$ is connected between the ground and the connection between elements $L_2$ and $Q_3$.

Switches $Q_1$, $Q_2$ and $Q_3$ are MOSFET or IGBT type switches controlled in opening and in closing with diodes installed in anti-parallel.

Figure 5:
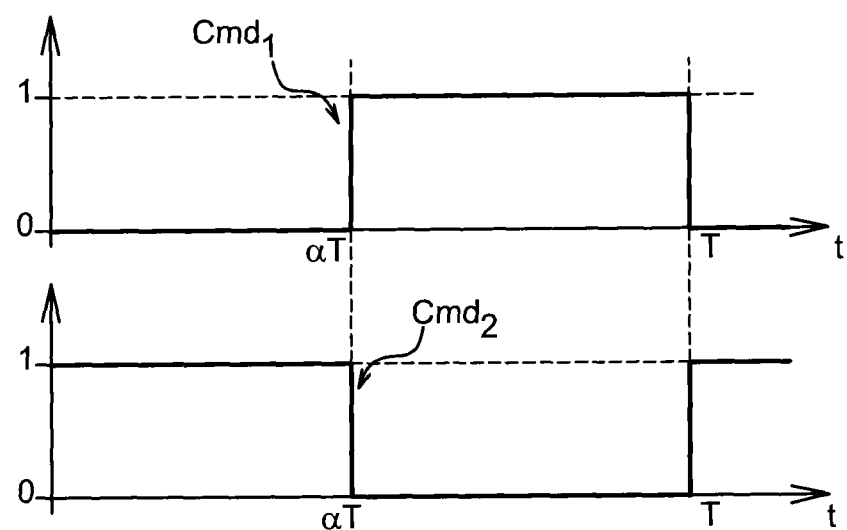
FIG. 5 is a diagram showing the principle of the cyclic ratio of control signals for the converter according to the invention.

FIG. 5 is a diagram showing the principle of the cyclic ratio of control signals as a function of time t for the converter according to the invention. Switches $Q_1$ and $Q_3$ are controlled by the same control signal called $Cmd_1$. The switch $Q_2$ is controlled by the control signal $Cmd_2$, complementary to Cmd$_1$. The diagram in FIG. 5 shows the principle of the cyclic ratio α of control signals within a single control period T.

The induction coils L$_1$ and L$_2$ have internal resistances r$_1$ and r$_2$ respectively. The resistance equivalent to the load between points A and B is called R. The duration of the control pulses (represented by the cyclic ratio α) controls the transformation ratio of the converter. The expression of the output voltage relative to the input voltage is written as follows:

$$\frac{U_{out}}{U_{in}} = \frac{(1-\alpha)}{\left[\frac{r_1}{R} + \frac{r_2}{R} \cdot (1-\alpha)^2 + (1-\alpha)^4\right]} \quad (1)$$

Figure 3A:
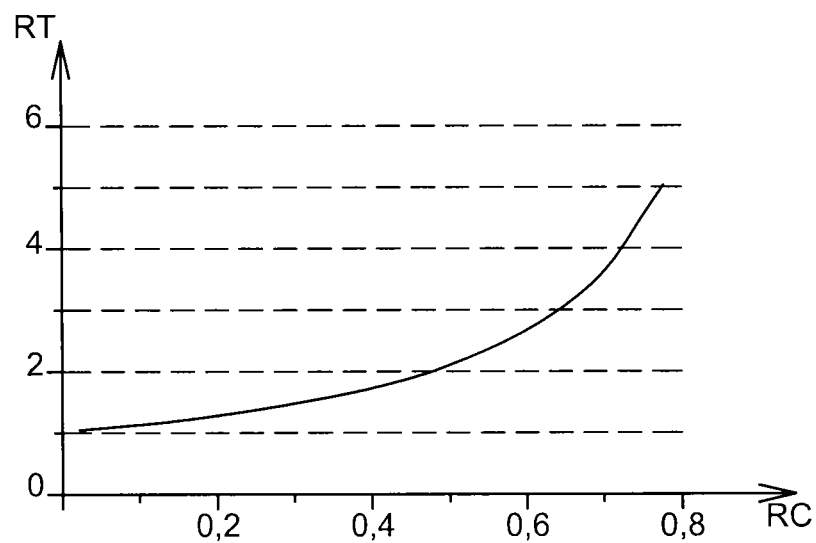
FIGS. 3A and 3B are diagrams showing the variation of the transformation ratio of the input voltage to a current-reversible DC/DC boost converter and the efficiency of the converter relative to the cyclic ratio of the control signal, respectively.
Figure 3B:
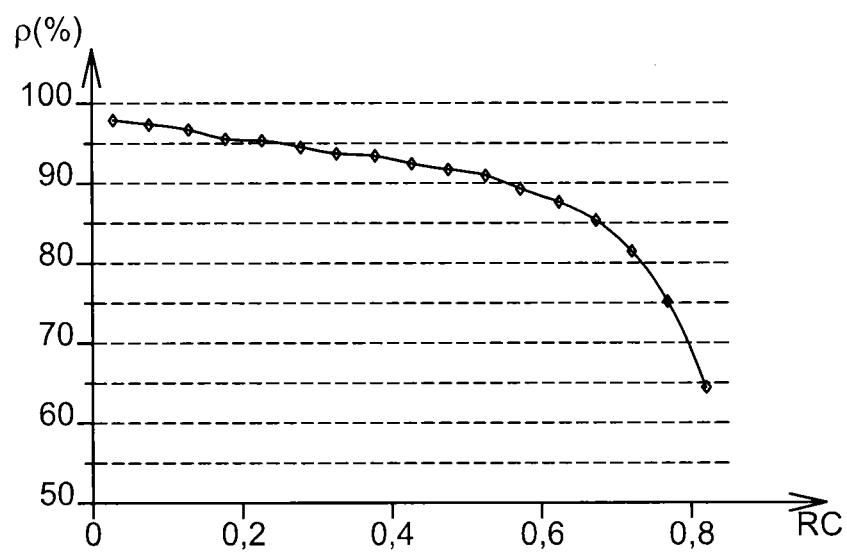

Relation (1) can be used to plot the curve showing the variation of the U$_{out}$/U$_{in}$ ratio as a function of the cyclic ratio α. This curve is shown as reference 31 in the diagram in FIG. 6. The corresponding variation curve for a reversible boost type DC/DC converter according to known art is also shown in this diagram as reference 32 (See FIG. 3A).

Figure 6:
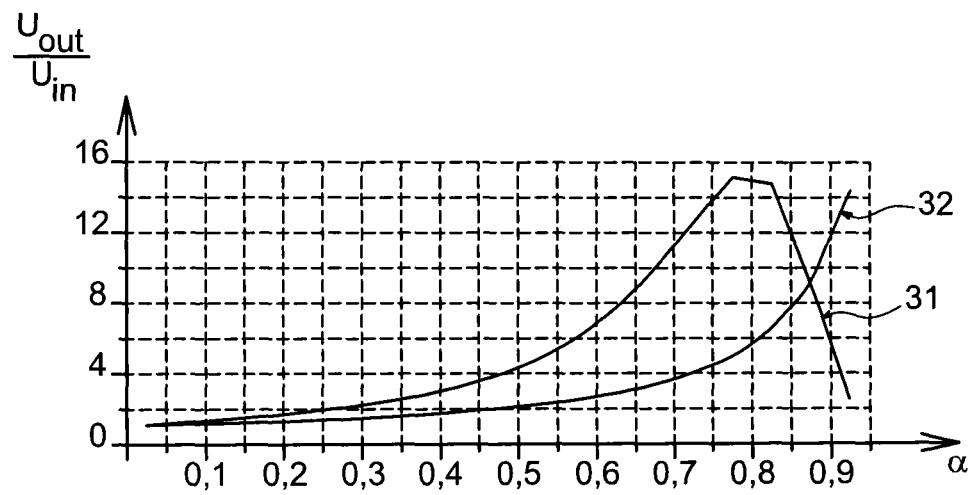
FIG. 6 is a diagram showing the variation of the voltage transformation ratio as a function of the cyclic ratio for the converter according to the invention.

For example, the values of the converter according to the invention may be as follows:
r$_1$=r$_2$=10 mΩ
L$_1$=625 μH and L$_2$=1250 μH
C$_1$=500 μF and C$_2$=250 μF
R=10Ω
chopping frequency: 20 kHz
U$_{in}$=25 V and U$_{out}$=100 V
I$_{in}$=40 A and I$_{out}$=10 A The cyclic ratio is usually between 0.25 and 0.75, considering switching frequency limitations of switches (MOSFET, IGBT, etc.) and to avoid increasing losses by switching in DC/DC converters. Under these conditions, the gain with the topology of the converter according to the invention is very much higher than with the standard topology. Note that the two curves in FIG. 6 are plotted under identical efficiency conditions.

We will now describe the operating principle of the reversible double-boost type DC/DC converter according to the invention. This description will be based on the two control signals shown in the diagram in FIG. 5. We will call the direction of operation direct when the current circulates from U$_{in}$ to U$_{out}$ and inverse when the current circulates from U$_{out}$ to U$_{in}$.

Operation in the Direct Direction (Boost)

Figure 7A:
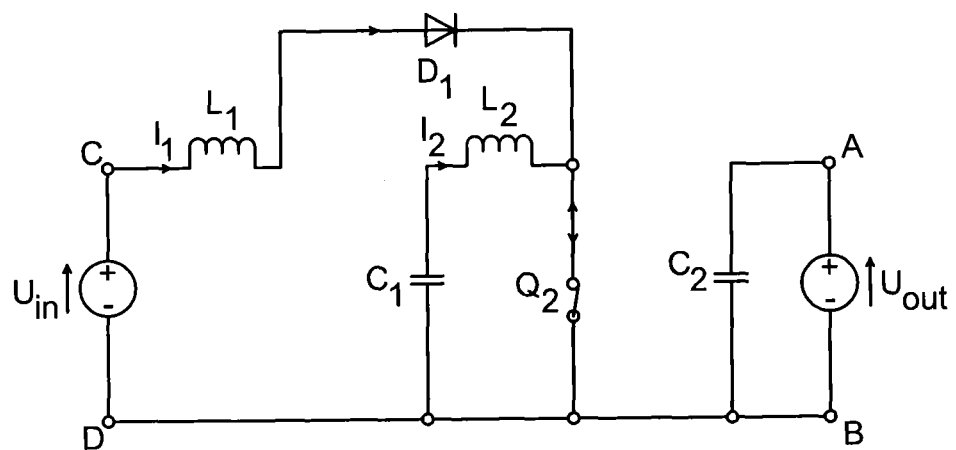
FIGS. 7A and 7B are electrical diagrams showing the operating principle of the converter in the direct (boost) direction according to the invention.

FIG. 7A shows how the converter according to the invention operates during the operating phase between t=0 and t=αT (in other words Cmd$_1$=0 and Cmd$_2$=1). Switches Q$_1$ and Q$_3$ are open and switch Q$_2$ is closed. Diode D$_1$ is naturally conducting and diode D$_2$ is blocked. This means that the induction coils L$_1$ and L$_2$ can be charged in parallel. Coil L$_1$ is charged through the input source U$_{in}$, and coil L$_2$ is charged through capacitor C$_1$.

Figure 7B:
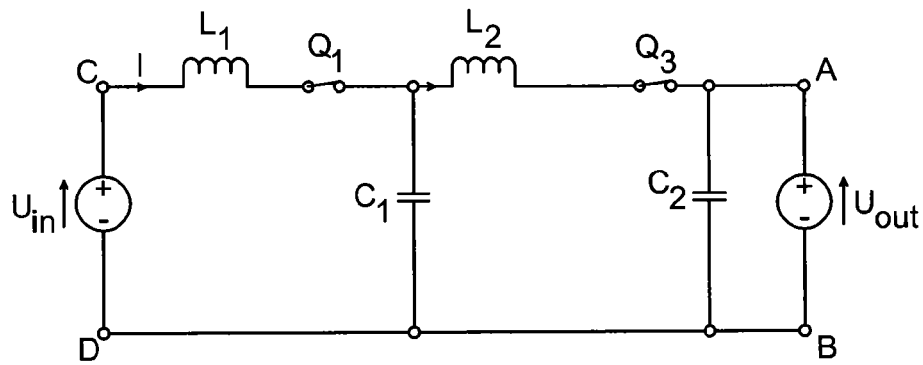

FIG. 7B shows operation of the converter according to the invention during the operating phase between t=αT and t=T (in other words Cmd$_1$=1 and Cmd$_2$=0). Switches Q$_1$ and Q$_3$ are closed and switch Q$_2$ is open. The two diodes D$_1$ and D$_2$ remain blocked. This causes discharge of the two induction coils L$_1$ and L$_2$ in series in output U$_{out}$ while charging capacitor C$_1$ once again.

Operation in Inverse Direction (Buck)

Figure 8A:
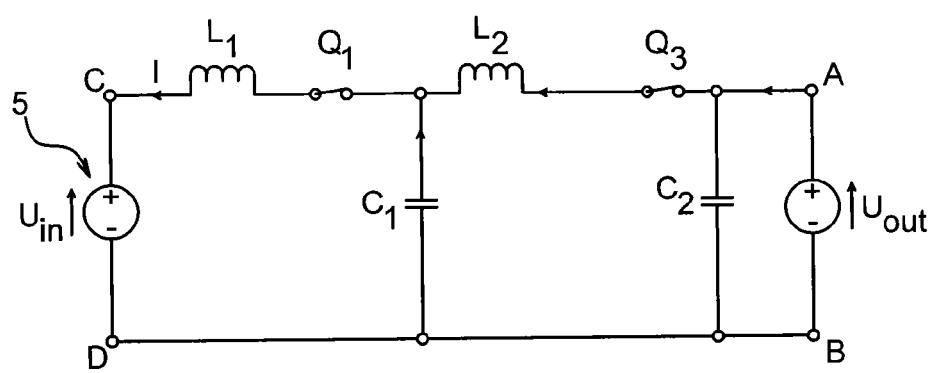
FIGS. 8A and 8B are electrical diagrams showing the operating principle of the converter in the reverse (buck) direction according to the invention.

FIG. 8A shows how the converter according to the invention operates during the operating phase between t=0 and t=αT (in other words Cmd$_1$=0 and Cmd$_2$=1). Switches Q$_1$ and Q$_3$ are closed and switch Q$_2$ is open. Diodes D$_1$ and D$_2$ are naturally blocked. In this operating phase, induction coil L$_2$ is charged through source U$_{out}$ and induction coil L$_1$ is charged through capacitor C$_1$ and the input source U$_{in}$.

Figure 8B:
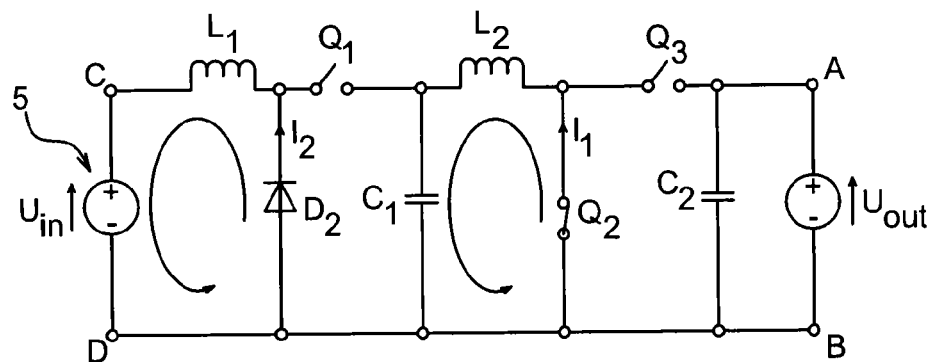

FIG. 8B shows operation of the converter according to the invention during the operating phase between t=αT and t=T (in other words Cmd$_1$=0 and Cmd$_2$=1). Switches Q$_1$ and Q$_3$ are open and switch Q$_2$ is closed. Diode D$_2$ conducts naturally and diode D$_1$ is blocked. This causes a discharge of the induction coil L$_2$ in the capacitor C$_1$ through switch Q$_2$ and discharge of the induction coil L$_1$ in U$_{in}$ through the free wheel diode D$_2$.

The invention claimed is:

1. A current-reversible DC/DC Boost converter that will act as an interface between a first DC voltage source and a second DC voltage source, comprising:
a first branch connecting positive poles of the first and the second DC voltage sources and comprising, in series connection from the first to the second DC voltage sources, a first induction coil, a first switch controlled in opening and in closing by a first control signal, a second induction coil and a third switch controlled in opening and in closing by the first control signal, whereby the first induction coil is intercalated between the positive pole of the first voltage source and the first switch, and the second induction coil is intercalated between the first switch and the third switch;
a second branch connecting negative poles of the first and the second DC voltage sources;
a third branch, connected in parallel to the series connection of the first switch and the second induction coil, comprising a diode of which an anode is on the side of the positive pole of the first voltage source;
a fourth branch, connected between the second branch and the connection between the first induction coil and the first switch, comprising a second diode of which an anode is on the side of the second branch;
a fifth branch, connected between the second branch and the connection between the first switch and the second induction coil, comprising a first capacitor;
a sixth branch, connected between the second branch and the connection between the second induction coil and the third switch, comprising a second switch controlled in opening and in closing by a second control signal complementary to the first control signal;
a seventh branch, connected in parallel on the second DC voltage source and comprising a second capacitor;
the converter being further configured so that:
when a voltage of the first DC voltage source is lower than a voltage of the second DC voltage source, during a control period varying from 0 to T and for a cyclic ratio α:
from time t=0 to time t=αT, where 0<α<1, the first and third switches are controlled in opening by the first control signal and the second switch is controlled in closing by the second control signal, and
from time t=αT to time t=T, the first and third switches are controlled in closing by the first control signal and the second switch is controlled in opening by the second control signal; and
when the voltage of the first DC voltage source is higher than the voltage of the second DC voltage source, during a control period varying from 0 to T and for the cyclic ratio α:
from time t=0 to time t=αT, where 0<α<1, the first and third switches are controlled in closinc by the first control signal and the second switch is controlled in opening by the second control signal; and from time t=αT to time t=T, the first and third switches are controlled in opening by the first control signal and the second switch is controlled in closing by the second control signal.

2. The converter according to claim 1, in which the cyclic ratio α is between 0.25 and 0.75.

3. The converter according to claim 1, in which the first, second, and third switches controlled in opening and in closing are components chosen from among MOSFETs and IGBTs, with diodes installed in parallel.

4. The converter according to claim 2, in which the first, second, and third switches controlled in opening and in closing are components chosen from among MOSFETs and IGBTs, with diodes installed in parallel.

5. A method of operating a current-reversible DC/DC Boost converter acting as an interface between a first DC voltage source and a second DC voltage source, the converter comprising:
    a first branch connecting the positive poles of the first and the second DC voltage sources and comprising, in series connection from the first to the second DC voltage sources, a first induction coil, a first switch controlled in opening and in closing by a first control signal, a second induction coil and a third switch controlled in opening and in closing by the first control signal, whereby the first induction coil is intercalated between the positive pole of the first voltage source and the first switch, and the second induction coil is intercalated between the first switch and the third switch;
    a second branch connecting the negative poles of the first and the second DC voltage sources;
    a third branch, connected in parallel to the series connection of the first switch and the second induction coil, comprising a diode of which an anode is on the side of the positive pole of the first voltage source;
    a fourth branch, connected between the second branch and the connection between the first induction coil and the first switch, comprising a second diode of which an anode is on the side of the second branch;
    a fifth branch, connected between the second branch and the connection between the first switch and the second induction coil, comprising a first capacitor;
    a sixth branch, connected between the second branch and the connection between the second induction coil and the third switch, comprising a second switch controlled in opening and in closing by a second control signal complementary to the first control signal;
    a seventh branch, connected in parallel on the second DC voltage source and comprising a second capacitor, the method comprising the steps of:
        when a voltage of the first DC voltage source is lower than a voltage of the second DC voltage source, during a control period varying from 0 to T and for a cyclic ratio α:
            from time t=0 to time t=αT, where 0<α<1, controlling the first and third switches in opening by the first control signal and controlling the second switch in closing by the second control signal; and
            from time t=αT to time t=T, controlling the first and third switches in closing by the first control signal and controlling the second switch in opening by the second control signal; and
        when the voltage of the first DC voltage source is higher than the voltage of the second DC voltage source, during a control period varying from 0 to T and for the cyclic ratio α:
            from time t=0 to time t=αT, where 0<α<1, controlling the first and third switches in closing by the first control signal and controlling the second switch in opening by the second control signal; and
            from time t=αT to time t=T, controlling the first and third switches in opening by the first control signal and controlling the second switch in closing by the second control signal.

* * * * *